Patented Aug. 27, 1946

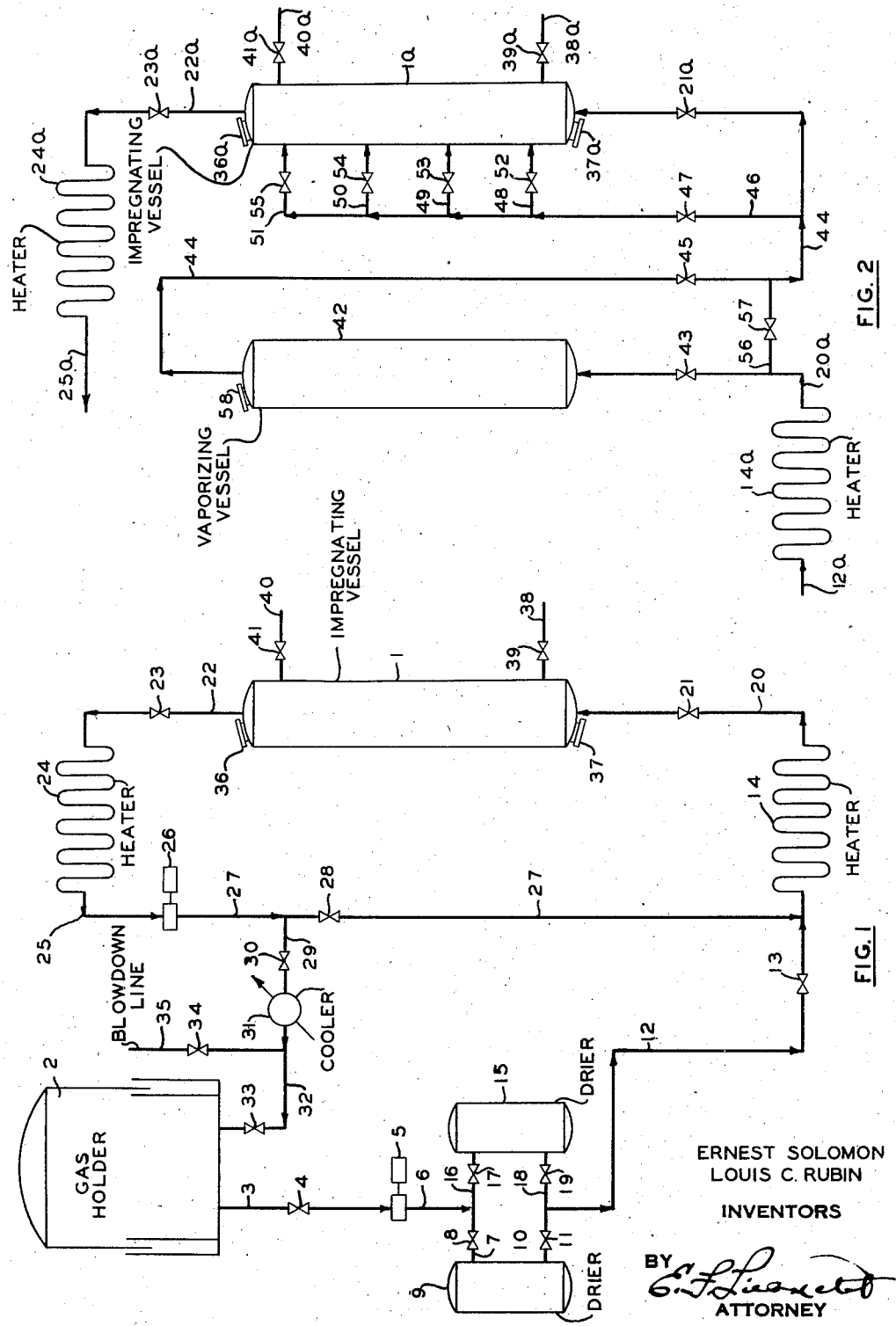

2,406,477

UNITED STATES PATENT OFFICE 2,406,477

CATALYST MANUFACTURE

Ernest Solomon, Nutley, and Louis C. Rubin, West Caldwell, N. J., assignors to The M. W. Kellogg Company, Jersey City, N. J., a corporation of Delaware Application May 29, 1942, Serial No. 444,970

1 Claim. (Cl. 252—251)

This invention relates to the preparation of catalyst material and more particularly to an improved method for impregnating a solid adsorbent supporting material with a metal halide.

Metal halides, such as the chlorides or bromides of aluminum, iron, zinc, zirconium, tantalum and columbium are highly active catalysts for hydrocarbon conversion reactions such as polymerization, isomerization and alkylation. Preferably, they are employed in combination with supports of highly adsorbent capacity such as activated carbons, carbon black, gels of silica or alumina, Activated Alumina and clays, to maintain their catalytic activity longer, thereby bringing about a greater production of conversion products per unit quantity of catalyst employed. Such supports may be impregnated with these metal halides in batch procedures, as for example by heating mixtures thereof in closed chambers to sublime the catalyst which is then adsorbed by, and deposited on, the support. This method, however, requires heating the materials for extended periods of time, particularly in those cases where it is desired to impregnate the support with the maximum amount of metal halide. The metal halide also may be dissolved in a solvent and deposited on a support by evaporative concentration in which the support is covered by the solution and the solvent is then evaporated from the mixture by prolonged heating. In preparing supported catalysts by these batch methods, the ingredients must be proportioned properly in the initial mixtures to produce supported catalysts which contain optimum amounts of the metal halide for the subsequent conversion reactions, otherwise the catalyst will tend either to vaporize and leave the reaction zone with the product or else fail to produce a favorable yield of conversion products per pound of catalyst.

It is an object of the present invention to provide a method of impregnating solid adsorbent supports with optimum amounts of metal halide catalyst which does not necessitate the use of predetermined proportionated mixtures of catalyst and support. It is also an object of this invention to provide a method of impregnation that will produce supported metal halide catalysts containing substantially the optimum quantity of adsorbed metal halides for the subsequent conversion reaction. It is a further object to provide a method of impregnating a solid adsorbent support with a metal halide catalyst at substantially the temperature and pressure of the subsequent conversion reaction. Another object of this invention is to provide a method for impregnating supports with metal halide which is adaptable to continuous operation. Other objects and advantages of the invention will become apparent during the course of the following description.

According to the present invention, adsorbent materials, such as activated carbons, carbon black, silica gel, alumina gel, Activated Alumina and natural and synthetic clays, are impregnated with a metal halide by being contacted with a continuously replenished stream of inert gas or vapor, carrying vaporized metal halide. This is accomplished by passing heated inert gas through a mixture of metal halide and adsorbent or in succession through a body of metal halide and a body of solid adsorbent material to vaporize the metal halide into the inert gas which then serves as a carrier for the vapors while they contact and become adsorbed by the support. The inert gas, thus stripped of its metal halide content is recirculated through the system. The passage of the heated metal halide-containing inert gas through the body of adsorbent material, advantageously, but not necessarily, is maintained at a velocity sufficiently moderate to insure substantially complete stripping of its metal halide content. The process is carried out either in batch or continuous procedures. In continuous operations the adsorbent supporting material is moved substantially continuously and either counter-currently or concurrently through a zone of contact with the stream of metal halide vapor-containing inert gas, the time of contact being regulated to permit adsorption of the required quantity of catalyst. The introduction of granules of adsorbent support into the contact zone, and their withdrawal therefrom, can be accomplished by any known method for handling solid particles.

Gases employed in this invention include any gas that substantially is not reactive either with the metal halide or the support under the conditions necessary for the impregnation and conversion operations. For this reason oxygen-containing compounds usually are to be avoided as such compounds exhibit a tendency to react with metal halides and thereby produce inferior catalysts. Necessarily the gas should be free from water vapor to avoid hydrolytic reactions. Nitrogen, light paraffin hydrocarbon gases which do not react substantially such as methane, ethane and propane, fluoranes such as tetrafluoromethane and hexafluoroethane possess suitable characteristics which make them acceptable carrying media for metal halide vapors.

Solid materials which are suitable as supports for metal halide catalysts because of their adsorptive quality include activated carbon, carbon black, clay-like or mineral-like materials as the kaolinites, terrana, floridine, pyrophillite, apophylite, meerschaum, bentonite, bauxite, chamotte, the permutites, the zeolites, and similar materials synthetically prepared, such as zeolites, aluminum oxides, silica gel, alumina gel, completely dehydrated alumina and the like. The natural or synthetically made supports, free from adsorbed water, are employed in any suitable granular form, prepared to desired size in operations comprising crushing, grinding, pulverizing, extruding or pelleting.

For further explanation of the present invention, reference is made to the accompanying drawing which represents diagrammatic elevational views of apparatus capable of carrying out the process of this invention. It is to be understood that reference to the drawing is by way of example only as the invention is capable of other embodiments and is not restricted to the physical limitations of the apparatus indicated in the drawing.

Figure 1 shows an embodiment of the invention in which heated inert carrier gas is passed repeatedly in a continuous cyclic arrangement through a vessel containing particles of metal halide and adsorbent supporting material, arranged either in a mixture thereof or in alternate layers.

Figure 2 illustrates an alternate processing arrangement whereby in a continuous cyclic arrangement inert carrier gas is heated and then is passed in succession through a body of metal halide and a body of adsorbent catalyst support.

Referring now to Figure 1, vessel 1 serves as the impregnation zone and contains metal halide catalyst and adsorbent supporting material suitably arranged for carrying out the method of this invention, as hereafter shall be described. A supply of inert carrier gas, or vapor, is stored in gas holder 2 and is withdrawn therefrom by way of line 3, having valve 4, for delivery to the low pressure side of compressor or blower 5 which then forces the gas through lines 6 and 7 and the then open valve 8 into drier 9. In its passage through drier 9 the gas is dehydrated by contact with any of the known drying agents, such as activated alumina or silica, to avoid any subsequent hydrolytic reaction. The dried gas leaves drier 9 through lines 10 and 12, provided with valves 11 and 13 respectively, and is then introduced into heater 14. Drier 15 may be used alternately with drier 9 as, for instance, during the interval when the contact material in drier 9 is undergoing regeneration. In this event valves 8 and 11 are closed, and valves 17 and 19 are opened to permit the flow of gas from line 6 to enter and leave drier 15 through lines 16 and 18 respectively. Regeneration of the contact material in driers 9 and 15 may be accomplished by any well known regeneration method, not shown on the drawing.

The carrier gas passes through heater 14 and is delivered by line 20, having valve 21, into the bottom of vessel 1 for contact therein with a metal halide and a supporting material. In passing through heater 14 the temperature of the gas is raised to a degree sufficient to enable it to vaporize the metal halide. The temperature level to which the carrier gas is raised is dependent somewhat upon the vaporization temperature of the particular metal halide present in vessel 1 although this temperature level may be higher, lower or equal to the vaporization temperature of the metal halide. For instance, should vessel 1 contain aluminum chloride as the metal halide catalyst, depending upon the subsequent conversion conditions as shall be explained, it is preferred in some cases to heat the carrier gas to 400° F. which is approximately 44° F. above the normal sublimation temperature of this material. At other times it is desirable to heat the carrier gas to a temperature somewhat below the vaporization temperature of the aluminum chloride and in this method vaporization is effected solely by the evaporative effect of the moving stream of gas so that a higher gas velocity is ordinarily desirable. This latter method, as will be seen later, is especially desirable when producing supported catalysts which have the greatest concentrations of metal halides.

The heated carrier gas upon entering vessel 1 from line 20 passes upwardly therethrough and by reason of its contained heat vaporizes the metal halide. Metal halide vapors thus formed are inter-mixed with the carrier gas and are borne along by it until they come in contact with and become adsorbed by the support. The carrier gas, substantially denuded of metal halide, then leaves vessel 1 by way of line 22, having valve 23, and is immediately introduced into heater 24 in order that its temperature can be raised sufficiently so that any residual metal halide which may have been carried along with the effluent gas from vessel 1 will not condense in the lines. Reheated, the carrier gas leaves heater 24 through line 25 where it is recirculated by blower or compressor 26 by way of line 27, having valve 28, to line 12 for return to vessel 1 through heater 14 and line 29, as described. During this operation use of line 29 is not required and consequently it is shut off from the circulating system by having valve 30 closed. When compressor 5 has delivered a sufficient amount of carrier gas from holder 2 to maintain the operating requirements of the above described circulatory system valve 13 is closed, and circulation of the gas around said system thereafter is maintained by blower or compressor 26. If necessary, however, compressor 5 may be used at any time to force make-up amounts of carrier gas into the circulatory system.

After the support has been impregnated with catalyst to the desired amount, valve 28 is closed and valve 30 is opened. This allows the contained gas to flow out of the circulatory system through line 29 into the inlet side of the cold scraped-surface cooler 31. In its passage through cooler 31 the temperature of the gas is lowered to condense any residual metal halide contained therein upon the cold walls of said cooler which then can be recovered by a suitable scraping means, not shown in the drawing. The thus denuded gas is returned for storage to holder 2 through line 32, provided with valve 33, or is vented from the system by having valve 33 closed and by opening valve 34 in vent line 35.

For carrying out batch impregnations, vessel 1 is charged through opening 36 with quantities of metal halide catalyst particles and granules of adsorbent supporting material prior to initiating the circulation of the carrier gas. The catalyst and support are intimately mixed before their introduction into vessel 1, or are placed therein in a plurality of alternate layers. In an alternate arrangement the entire body of the catalyst is located in the bottom section of vessel 1 beneath the total mass of catalyst-free supporting material. Whatever arrangement of catalyst and support is used, however, it is always preferable to have a body of the adsorbent support, free from adsorbed catalyst, positioned in the upper section of vessel 1 in the immediate proximity of the outlet opening into line 22, to adsorb residual amounts of metal halide vapors from the exiting carrier gas. This also serves as a precaution against condensation of metal halide in any part of the system subsequent to the adsorption zone.

After vessel 1 has been filled with catalyst and support, heated carrier gas passing therethrough vaporizes and carries the metal halide through the body of support until it is entirely adsorbed. To accomplish this most expeditiously, the passage of the metal halide-carrier gas mixture through vessel 1 preferably is maintained at a velocity sufficiently moderate to afford ample time for the gas stream to be substantially stripped of its metal halide content.

For further description of the invention, by way of illustration, reference is made to the following examples:

Example I

Activated carbon such as is sold under the trade name "Norit" was obtained in particle sizes commonly called 6-10 mesh. This material was subjected to drying at 800° F. to drive off volatile and adsorbed matter. After cooling, it was mixed with aluminum chloride in powdered form in the proportion of three parts of activated carbon for each part of aluminum chloride. The mixture was charged to an impregnating vessel and a stream of nitrogen slowly passed therethrough at a velocity of approximately 6 to 7 feet per hour. Beginning at 325° F. the temperature of the nitrogen passing through the impregnating vessel was increased gradually throughout the period of impregnation to a final maximum temperature of 400° F. A supported catalyst was thus prepared which contained 25 weight percent of aluminum chloride.

Example II

A supported aluminum chloride catalyst was made using as support dried "Norit" activated carbon, obtained and prepared as described in the preceding example. Powdered aluminum chloride in the amount of 35 weight percent was mixed with 65 weight percent of "Norit" carbon and the mixture charged to a vertical impregnating vessel. Upon this mixture was superimposed a body of "Norit" carbon equal to one fourth the volume of the mixture. The contents of the impregnating vessel were maintained at 400° F. and a stream of nitrogen was passed upwardly therethrough at a velocity of the order of 6 to 7 feet per hour for 2½ hours. Following this procedure for two additional hours the velocity of the nitrogen was increased fifteen fold and at the same time the temperature was reduced to 325° F. which is approximately 31° F. below the sublimation temperature of aluminum chloride. At no time during either of these procedures did free aluminum chloride appear in the exit vapors from the impregnating vessel. The aluminum chloride appeared in greater concentration in the upper three quarters of the prepared catalyst, being of the order of 32-33% by weight in this portion of the catalyst mass as compared to the 28% by weight in the lower quarter of the bed. When a portion of the material from the bottom section of the thus prepared supported catalyst was heated separately in a closed vessel to 400° F. it did not evolve off any vapors of free aluminum chloride.

Example III

A body of granular aluminum chloride was placed in the bottom of a vertical impregnating vessel in a quantity as to occupy one-fifth of the total volume of said vessel. The remaining four-fifths volume of the impregnating vessel was filled with "Norit" activated carbon, prepared as described in the preceding examples. The vessel and its contents then were heated to 400° F. and a stream of nitrogen slowly passed upwardly therethrough at a velocity of 6 to 7 feet per hour for 7½ hours. Analysis of the prepared body of supported catalyst showed that a slight aluminum chloride concentration gradient existed from a maximum at the bottom to a minimum at the top. During the preparation procedure there was no evidence of free aluminum chloride in the exit vapors leaving the top of the impregnating vessel.

The slight catalyst concentration gradient in the supported catalyst of Example III is the result of initially concentrating all the granular aluminum chloride in the bottom of the impregnating vessel. The absence of such a gradient in the supported catalyst prepared in Example II shows that by having the aluminum chloride distribution in the original mixture properly equalized it is possible to eliminate such a concentration gradient in the finally prepared catalyst.

The maintenance of vessel 1 at a super-atmospheric pressure during the adsorption period is preferable for most efficient operation but is not essential to the execution of the present invention.

In those cases where the carrier gas is introduced initially into vessel 1 at a temperature above the equilibrium vaporization temperature of the metal halide, the lowering of the gas temperature during its passage through that vessel is to be avoided so that crystals of free metal halide may not be precipitated from the gas stream. The metal halide crystals deposited in this manner are not adsorbed by the supporting material. These free crystals of metal halide if present in the finally prepared catalyst will sublime during the subsequent conversion reaction and will have a detrimental effect both on catalyst life and product yield. The temperature within vessel 1 can be kept above the vaporization temperature of the metal halide by placing suitable exterior insulation on vessel 1 and by adding sufficient preheat to the carrier gas. As an alternate precaution against decrease in temperature within vessel 1 additional heat may be put into that vessel, to compensate for heat losses by radiation and conduction, by an indirect heat interchange means, not shown in the drawing.

The degree of adsorption of catalyst by the supporting material varies with temperature, the adsorption effect being greater at the lower temperatures. It is possible therefore at a temperature even below the vaporization temperature of the metal halides, by employing a longer time of contact, to prepare supported catalysts which contain greater amounts of metal halides than can be adsorbed by the same supports in contact with metal halide vapors at higher temperature levels. This temperature effect on the adsorptive ability of the supports has an important relationship to the use of the catalyst in the subsequent conversion reactions as the temperature conditions of the various conversions in which metal halide catalysts are employed vary over a large range. When elevated temperatures are employed for hydrocarbon conversions it is advantageous to use supported catalysts containing minor amounts of metal halides, namely, supported catalysts prepared by adsorbing metal halide from vapors at the higher temperature levels. By thus impregnating only that amount of metal halide on a support which can be retained by that support under these more severe conversion conditions, unnecessary loss of catalyst material from the reaction zone by vaporization is avoided and the accompanying effect of loss of activity and decrease in life of the catalyst thereby is eliminated.

In illustration of the foregoing, it is well known that the isomerization of low molecular weight hydrocarbons with aluminum chloride ordinarily is accomplished at temperatures up to about 575° F. whereas, polymerization and alkylation reactions normally are conducted with the catalyst at temperatures ranging downwardly from about 140° F. to as low as −58° F. Consequently the optimum quantity of aluminum chloride adsorbed by a support such as activated carbon in the preparation of an isomerization catalyst ordinarily is substantially lower than the optimum quantity of this catalyst to be adsorbed for either polymerization or alkylation. Regulation of the temperature employed in vessel 1, therefore, regulates the degree of metal halide adsorption and this degree of adsorption is determined and regulated in accordance with the temperature to which the prepared catalyst will be subjected in the subsequent conversion, otherwise there occurs an unnecessary loss of metal halide from the reaction zone.

The finished catalyst may be removed from vessel 1 through opening 37 for use elsewhere in hydrocarbon conversion operations. However, the preparation of the catalyst may be effected in the same vessel which is to be employed for carrying out the hydrocarbon conversion treatment. For example, after the impregnation treatment has been accomplished valves 21 and 23 are closed. This isolates vessel 1 from said carrier gas circulatory system. The hydrocarbons to be reacted then are introduced through line 38, provided with valve 39 and subjected to conditions of pressure and temperature suitable for accomplishing the desired conversion treatment. The inert carrier gas remaining in vessel 1 may have been removed either by evacuation or by displacement by the hydrocarbon reactant. The hydrocarbons pass upwardly through the chamber in contact with the catalyst and the reaction products are withdrawn through line 40, provided with valve 41. The direction of flow of the reactants through vessel 1 is not essential, however, since if desired, they may be introduced through line 40 and withdrawn through line 38. For the purpose of maintaining catalyst activity while carrying out the conversion treatment additional amounts of the metal halide may be incorporated in the hydrocarbon feed either in solution therein or as a slurry, if the feed is charged in the liquid phase or as a vapor mixture with the feed in the event the conversion is conducted in the vapor phase. It is within the scope of the invention to arrange a plurality of vessels similar to vessel 1 which may be arranged for alternate connection with the metal halide-inert gas circulation system, and the hydrocarbon conversion system. By this method of operation one or more of such catalyst-containing vessels may be undergoing impregnation and/or regeneration while the remaining vessels of the group are employed in hydrocarbon conversion.

The apparatus diagrammatically shown in Figure 2 is used when it is desired to vaporize the metal halide in a zone separate from that used for the impregnation. This process arrangement is particularly desirable when the support is being impregnated uniformly with metal halide in concentrations of less than the maximum or when the support is being impregnated by a continuous operation. In the modified embodiment, shown in Figure 2, the essential apparatus differs from the apparatus of the previous processing flow arrangement, shown in Figure 1, only by the addition of a vaporizing vessel 42 and the intermediate injection lines 48, 49, 50 and 51, the remainder of the system being similar to that shown and described in Figure 1 and hence is omitted. In this modification, elements which have substantially the same structure and function to corresponding elements in Figure 1 are designated with similar reference numerals with the subscript $a$; detailed description of these elements is superfluous.

In preparing supported metal halide catalyst by batch operations in vessel 1a, when it is desired to impregnate the granular support to its full adsorptive capacity in accordance with the present modification, the heated carrier gas from heater 14a is delivered by line 20a, having valve 43, into the bottom of vessel 42 for contact with the body of granular metal halide contained therein. Vessel 42 usually is charged initially through opening 58 with a sufficiency of granular metal halide particles for the complete impregnating operation, but additional make-up amounts of metal halide may be added thereto either continuously or intermittently during the operation by any well known charging means, not shown on the drawing. The effluent from vessel 42, consisting of a mixture of carrier gas and vaporized metal halide, flows through line 44, provided with valves 45 and 21a respectively, and is introduced into the bottom of vessel 1a for contact therein with a body of granular supporting material. Ordinarily to avoid depositing metal halide in the transfer line 44 the effluent from vessel 42 should be heated to a temperature not substantially higher than the temperature to be maintained in vessel 1a. The contact conditions imposed on the bodies of catalyst and support in vessels 42 and 1a and on the circulatory flow of carrier gas therethrough, are the same as those which have been described in the embodiment for Figure 1, and hence will not be reiterated.

When preparing supported catalysts by batch operations, particularly a catalyst which contains less than the maximum concentration, the supporting material adjacent to the entrance point of the stream of catalyst-carrying medium tends to become impregnated excessively with catalyst whereas, supporting material adjacent to the exit is impregnated insufficiently. Such a condition of non-uniformity in concentration is undesirable for, during hydrocarbon conversions promoted by these non-uniformly impregnated catalysts, part of the catalyst mass will have a low activity and yet metal halide will sublime from those portions containing excessive quantities thereby further impairing catalytic activity. To avoid making preparations which contain uneven distribution of adsorbed metal halide, alternative methods of preparation are resorted to. According to one preferred method, metal halide enriched carrier gas is passed, as described heretofore, through vessel 1a for a predetermined period of time. Then, by closing valves 43 and 45 and opening valve 57 in jump-over line 56 vessel 42 is by-passed, and the heated but metal halide-denuded carrier gas from heater 14a is passed directly through vessel 1a. This removes the metal halide from the zones of excessive concentrations in vessel 1 and builds up the concentrations thereof in those zones containing insufficient amounts, and results in a substantially uniformly supported catalyst. During this procedure the inert gas usually is passed through vessel 1a at a somewhat lower temperature as, for instance, in the manner described in Example II.

The granular adsorbent support also may be impregnated uniformly with controlled amounts of metal halide in accordance with a modified batch procedure. In this case heated carrier gas bearing the catalyst vapors from vessel 42 through line 44, is passed upwardly through the granular adsorbent mass within vessel 1a until the lower section thereof has adsorbed the desired quantity of the metal halide. Valve 21a then is closed and at the same time valve 47 in line 46 is opened. The catalyst-bearing gas thereby is turned aside from line 44 and introduced into vessel 1a through line 46 at the level of injection line 48. The adsorbent material in vessel 1a below said injection line 48, no longer receiving a replenishment of metal halide, will remain substantially at the desired catalyst concentration during the time that the remaining upper sections of the body of support are being impregnated. By manipulating valves 52, 53, 54 and 55 in injection lines 48, 49, 50 and 51 in succession, the whole body of adsorbent material in vessel 1a finally is impregnated uniformly with a predetermined concentration of metal halide. Valve 55 is then closed, the impregnating procedure terminated and the carrier gas exhausted from the circulatory system, as previously described. The finished catalyst is removed from vessel 1a through opening 37a for use elsewhere or, if again desired, it may be employed in situ in vessel 1a for a hydrocarbon conversion reaction.

As has been explained, the impregnation procedure in vessel 1a is regulated to attain any desired degree of catalyst concentration on the adsorbent support. A controlled and yet a uniformly impregnated supported catalyst is obtained expeditiously in a continuous operation. According to this modification, particles of the granular adsorbent support are passed downwardly and continuously through vessel 1a in countercurrent relationship to the flow of the metal halide vapors. In this procedure, fresh supplies of the adsorbent support are fed continuously into vessel 1a through opening 36a by a suitable continuous feeding arrangement, not shown in the drawing, and passed downwardly therethrough at a rate regulated to provide for a sufficient time of contact with the rising metal halide vapors such as is necessary for the production of a supported catalyst of desired concentration. The upward velocity of the metal halide-carrier gas mixture through vessel 1a is maintained sufficiently moderate to accomplish the substantial stripping of metal halide vapors from the carrying medium. Quantities of the finally impregnated material, comparable to those amounts of the unimpregnated support charged to vessel 1a, are removed continuously from the bottom thereof through opening 37a by a suitable mechanical handling arrangement, again not shown in the drawing.

We claim:

A method for uniformly impregnating adsorbent catalyst support with aluminum chloride catalyst in the absence of hydrolytic or other reactions which comprises passing a carrier gas, which of itself does not undergo conversion and which is substantially unreactive with either aluminum chloride catalyst or the catalyst support at the conditions of impregnation, over a solid adsorptive agent to dehydrate said carrier gas, passing the dehydrated gas over granular aluminum chloride at a temperature between 100° F. and 400° F. and at a velocity sufficient to vaporize substantial quantities of aluminum chloride into said gas, contacting a body of adsorbent catalyst support free from adsorbed water with the aluminum chloride-enriched carrier gas with essentially no change in the temperature and velocity of the gas for a period of time sufficient to substantially saturate said body of catalyst support with aluminum chloride, discontinuing said contact of granular aluminum chloride with the carrier gas and thereafter further contacting the aluminum chloride-contaning adsorbent support at a lower temperature with the carrier gas at a substantially increased velocity for a period of time sufficient to transfer aluminum chloride from portions of the impregnated body of adsorbent support containing higher amounts to portions thereof containing lesser amounts until a substantially uniformly impregnated supported catalyst is produced.

ERNEST SOLOMON.
LOUIS C. RUBIN.